(12) United States Patent
Todd et al.

(10) Patent No.: US 6,711,574 B1
(45) Date of Patent: Mar. 23, 2004

(54) RETRIEVAL OF MANAGEMENT INFORMATION

(75) Inventors: Stephen Todd, Shrewsbury, MA (US); Andy Kubicki, Westborough, MA (US); Walter A. O'Brien, III, Westboro, MA (US); Michel Fisher, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/496,308

(22) Filed: Feb. 1, 2000

(51) Int. Cl.[7] .............................................. G06F 17/30
(52) U.S. Cl. ...................................................... 707/100
(58) Field of Search ................................ 707/100, 102, 707/1, 200; 710/5, 52

(56) References Cited

U.S. PATENT DOCUMENTS

| 5,457,794 A | * | 10/1995 | Azumatani et al. ............. 707/2 |
| 5,687,373 A | * | 11/1997 | Holmes et al. .............. 709/328 |
| 5,758,183 A | * | 5/1998 | Scales ............................ 710/5 |
| 5,970,494 A | * | 10/1999 | Velissaropoulos et al. .. 707/102 |
| 5,995,921 A | * | 11/1999 | Richards et al. ................ 704/9 |
| 6,003,043 A | * | 12/1999 | Hatakeyama et al. ........ 707/203 |
| 6,192,369 B1 | * | 2/2001 | Doan et al. .................. 707/103 |

* cited by examiner

*Primary Examiner*—Greta Robinson
(74) *Attorney, Agent, or Firm*—Bromberg & Sunstein LLP

(57) ABSTRACT

A system and method of retrieving management information in a protocol environment having a maximum retrieval byte size is provided. An example of such a protocol environment is SCSI environment. A retrieval command is sent from an initiator to a target where the retrieval command is capable of retrieving more information than the maximum allowed by the protocol. A target buffer is created at the target in response to the retrieval command and the target buffer is filled with management information associated with the target. The management information may be in the form of mode pages when the method is applied in a SCSI environment. The management information is then sent from the target buffer to the initiator. If all of the management information is not retrieved, a second retrieval command is sent by the initiator to retrieve at least a portion of the unsent management information.

32 Claims, 7 Drawing Sheets

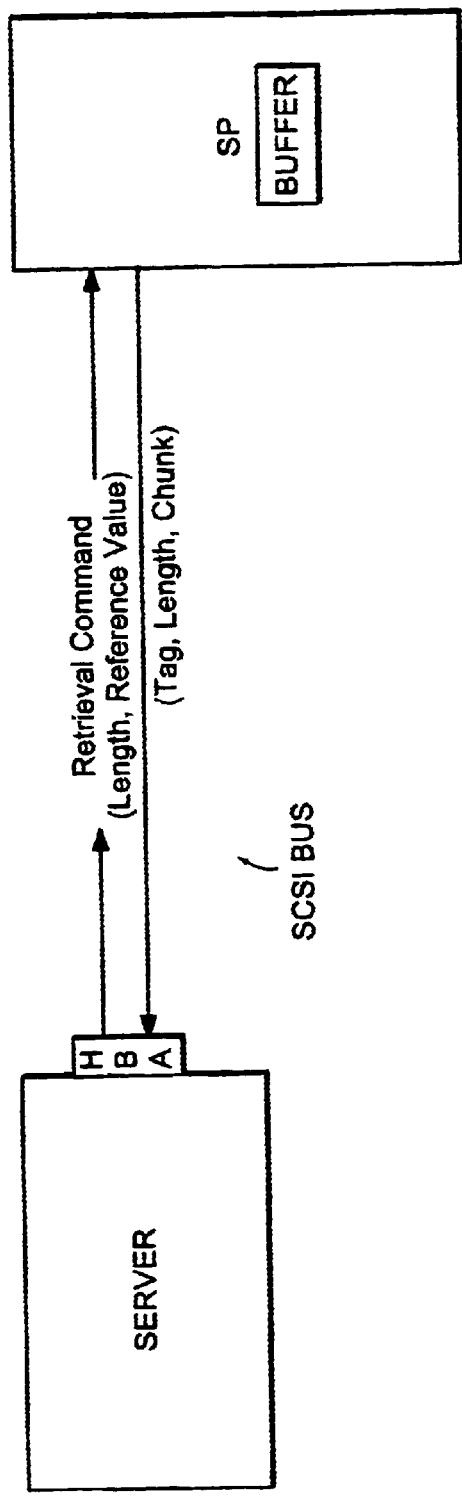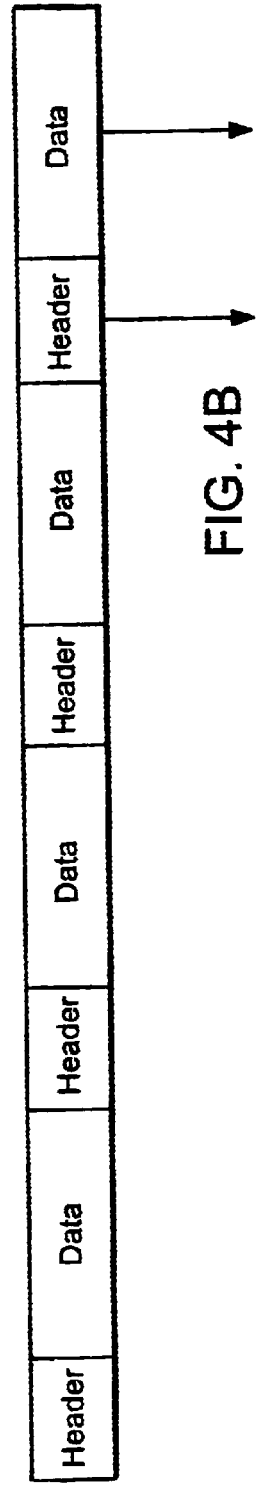
FIG. 4A
FIG. 4B
FIG. 4C

RETRIEVAL OF MANAGEMENT INFORMATION

FIELD OF INVENTION

This invention relates to computer systems, and more particularly to retrieving management information in computer systems.

BACKGROUND ART

SCSI (small computer system interface) is a protocol for controlling the input and output of connected devices over a SCSI bus. In a SCSI environment, management information about the status of devices within the computer system may be retrieved by a device known as an initiator. An initiator issues a SCSI standard mode select and mode sense command combination to a device known as a target. The mode select command provides a means for the initiator to specify the medium, logical unit, or peripheral device parameters to the target. The initiator then sends a mode sense command to the target which allows the target to report the parameters to the initiator in the form of mode pages containing management information.

Such a system works well for the retrieval of management information where there are a few connected devices within the computer system. However, in a computer system where there are multiple devices connected to the SCSI bus and multiple peripherals attached to the devices, obtaining the status of all of the devices requires the issuance of multiple mode select/mode sense commands. With each pair of commands, there is an inherent latency as the commands traverse the computer system. Delays occur in the device's processor along with delays at the application level, driver level, adapter level and bus level. In a storage system which contains multiple storage disks residing in a disk array managed by a storage processor connected to a management server by a SCSI bus, thousands of mode select/mode sense commands may be needed to obtain the status of all of the connected components. For example, a storage system which has 120 disks with 32 LUNs and 2 storage processors, full polling of the management information of the system takes 500 request per storage processor and 1000 requests per array. If the average round trip latency approaches 120 milliseconds, it takes approximately 4 minutes to retrieve all of the requested information. As storage processing systems grow in scale in which additional disks and additional storage processors are added, delays in retrieving management information will continue to increase proportionally.

One solution to this problem is the issuance of a mode sense page code 3F command which requests that all of the management information in the form of mode pages are retrieved and sent from the target to the initiator. Again this works well where there are a few connected devices. However, the mode sense page code 3F command can only retrieve data up to a maximum byte size of 65,536 bytes. In the case where the data to be retrieved exceeds this maximum byte size, the mode sense page code 3F command fails. To retrieve the required data for all the components in a large system where the management information exceeds 65,536 bytes, the initiator must resort to the mode select/sense command combination.

SUMMARY OF THE INVENTION

The present invention is directed to a method of retrieving management information in a protocol environment having a maximum retrieval byte size. An example of such a protocol environment is SCSI environment. A retrieval command is sent from an initiator to a target where the retrieval command is capable of retrieving more information than the maximum allowed by the protocol. A target buffer is created at the target in response to the retrieval command and the target buffer is filled with management information associated with the target. The management information may be in the form of mode pages when the method is applied in a SCSI environment. The management information is then sent from the target buffer to the initiator. If all of the management information is not retrieved, a second retrieval command is sent by the initiator to retrieve at least a portion of the unsent management information. The retrieval command may be sent from the initiator to the target via a cable and in a SCSI environment a SCSI cable or an optical fiber may be used.

The management information may be sent from the buffer of the target to a host bus adapter which has a maximum input buffer size and then from the input buffer to a buffer residing on a server. In some embodiments the management information is sent to the host bus adapter in data chunks which are limited to the maximum size of the input buffer size. In such embodiments, the data chunks have appended header information. The header information of each data chunk may include a tag parameter and the tag value may indicate that a continuation is necessary if all of the management information cannot be sent from the target to the initiator in one transmission. If a continuation is indicated in the tag parameter such that it is a continuation tag, the continuation tag is then accompanied by a reference value which identifies a next data chunk, so that the next chunk can be located and sent from the target buffer to the host bus adapter. In one embodiment, the reference value resides within the data chunk.

BRIEF DESCRIPTION OF THE DRAWINGS

The foregoing features of the invention will be more readily understood by reference to the following detailed description taken with the accompanying drawings:

FIGS. 4A–C show the transfer of chunk data with a corresponding continuation tag from the target to the initiator.

FIG. 4A is a schematic diagram which shows a server attached to a storage processor by means of a host bus adapter and a SCSI bus.

FIG. 4B shows multiple mode pages may be sent from the buffer of the target to the initiator at one time.

FIG. 4C shows the final header and data section when there is a continuation.

DETAILED DESCRIPTION OF SPECIFIC EMBODIMENTS

In the following detailed description and appended claims the term "bus" shall refer to any connection between an initiator and a target which transports communication commands. For example, a bus may be a fiber optic cable or a 16-bit standard SCSI cable. In the following description and claims the term "software" shall refer to computer code which may be used in conjunction with a processor for performing a desired task or to a hardware implementation of such computer code in which the computer code is embodied as electrical components or to a combination of hardware and computer code for performing the desired task.

Figure 1:
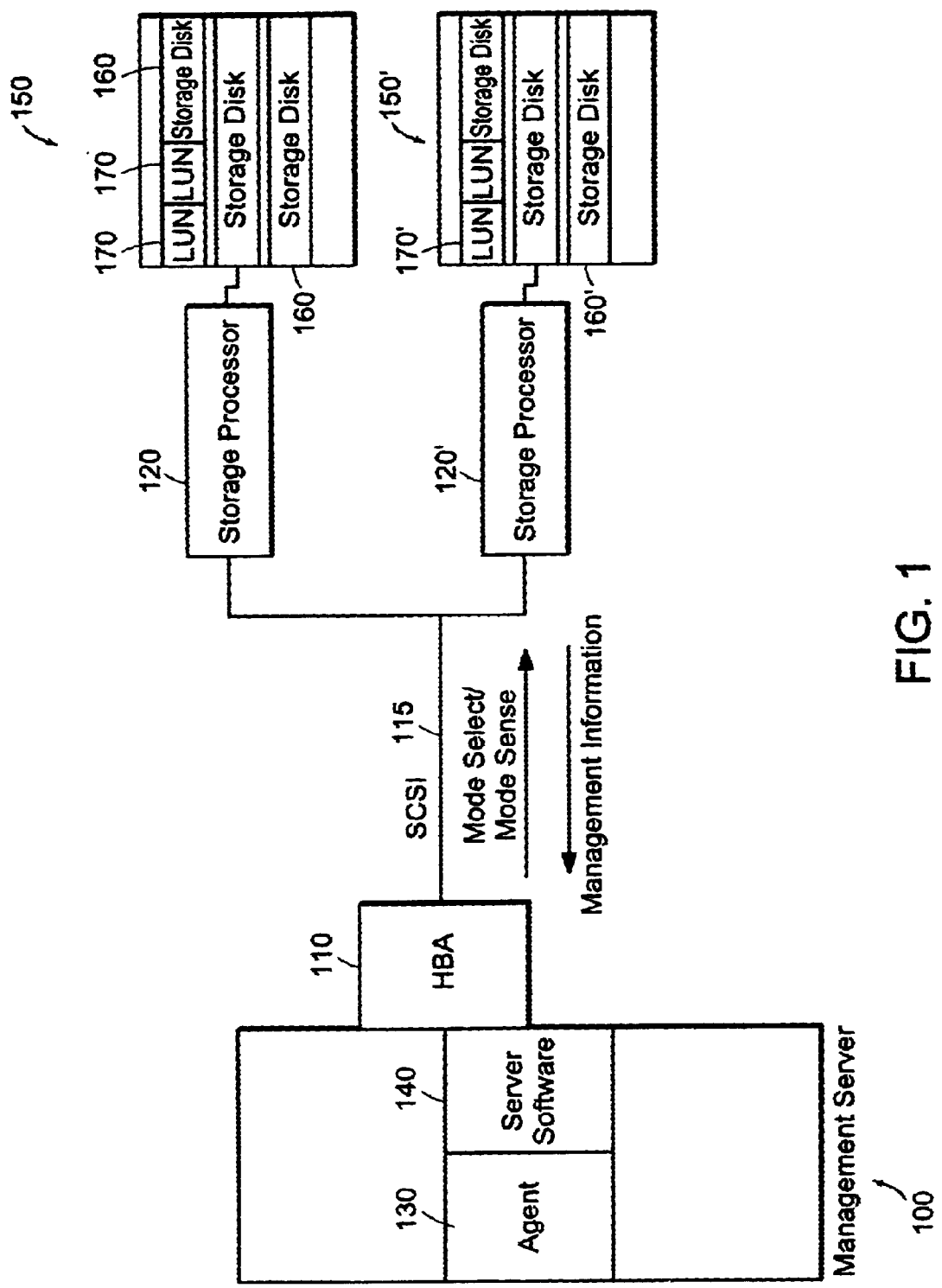
FIG. 1 is a schematic diagram of an environment for applying the retrieval of management information.

FIG. 1 is a schematic diagram of one system for implementing a method for the retrieval of management information. The system which is shown is a data storage system. The data storage system in FIG. 1 is shown using a SCSI protocol for the transfer of data and the transporting of communication commands. Typically, a protocol provides a data structure for the parameters of each command and in SCSI, the data structure is know as a command descriptor block (CDB). By using a data structure comprised of multiple fields, each containing a parameter having a defined length, where each field is placed in a set order when a command is sent, the receiver of the command is able to parse the data by each field and interpret the command. In the SCSI protocol, in the issuance of a mode sense page code 3F command, the length of retrievable management information is limited to a size of two bytes. More information about the SCSI protocol can be found in the American National Standards Institute (ANSI) specification for information systems entitled *Small Computer System Interface-2* approved on Jan. 31, 1994 which is incorporated herein by reference in its entirety. The method for implementing the retrieval of management information overcomes this limitation by creating a user-defined protocol command along with both server software and target software which can generate and implement the user-defined command. The use of the SCSI protocol is meant to be exemplary and other communication protocols which also have such byte size limitations for command parameters may be adapted in accordance with the method and apparatus for retrieval of management information. It should be understood by those skilled in the art that the use of a data storage system is meant to be exemplary and the system and apparatus for the retrieval of management information may be implemented in other environments.

FIG. 1 shows a management server 100 connected to a plurality of storage processors 120,120' by means of a host bus adapter 110 and a SCSI bus 115. The SCSI bus 115 allows for the communication of commands between the management server 100 and the storage processors 120,120' for gathering requested management information. The management server has resident management agent software 130 which receives requests for management information about devices connected to the storage processors 120,120' from remote sources. The management server 100 also runs server software 140 which operates in conjunction with the management agent software 130. The server software 140 oversees the status of all of the devices and data connected to the server and retrieves management information as requested by the management agent 130 about one or all of the devices in the form of standard SCSI mode pages by issuing a vendor-unique SCSI command. The server software 140 on the management server 100 acts as an initiator of a SCSI command and one of the storage processors 120,120' acts as the target of that command. In FIG. 1 two storage processors are shown, but any number of storage processors may be included wherein the number is limited only by the protocol, which, for SCSI-2 protocol, up to sixteen devices can be supported. Attached to the storage processors 120' are devices known as disk arrays 150,150'. The disk arrays 150,150' contain multiple storage disks 160,160' which are arranged into LUNs (logical unit numbers) 170,170'. The storage disks 160,160' provide a means for storing data and additionally contain management information about the status of the disk arrays 150,150'. The storage processors each have associated local memory (not shown) which contains management information.

Figure 2:
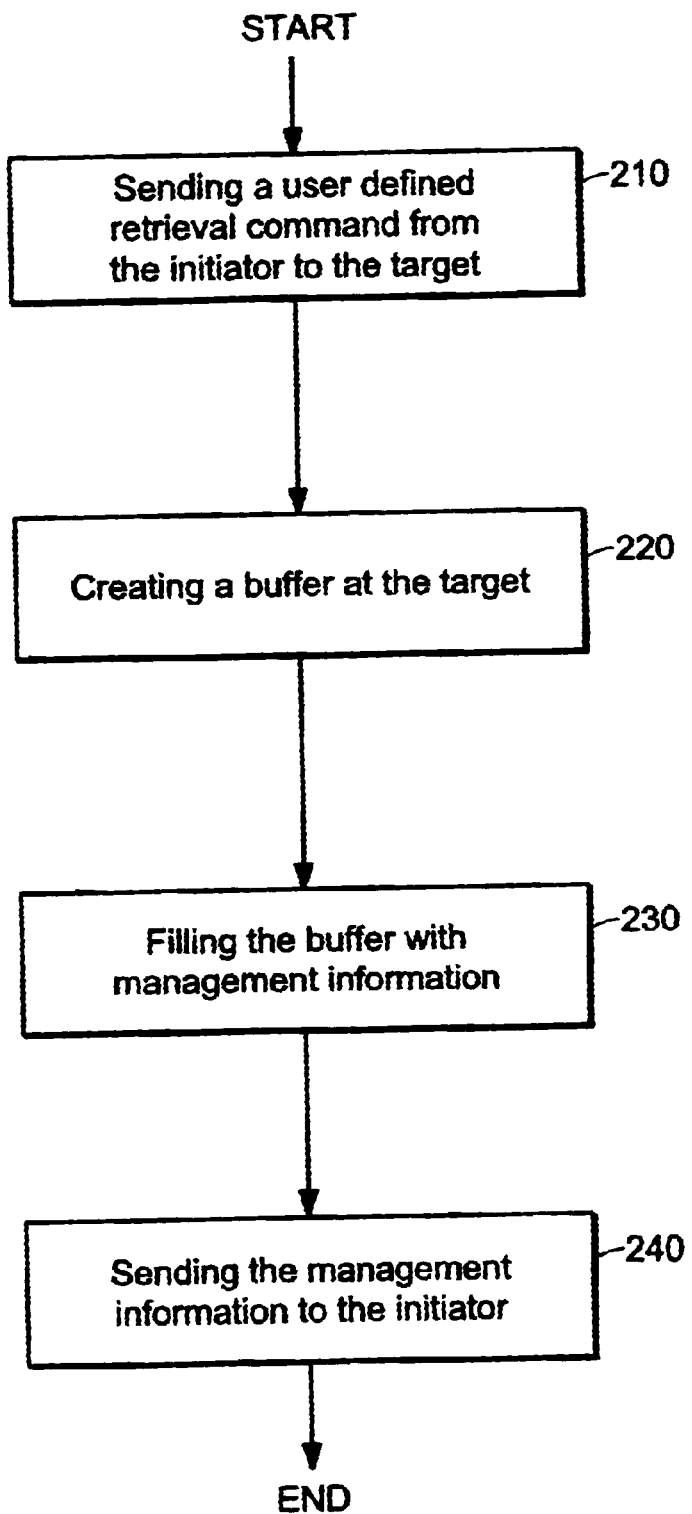
FIG. 2 is a flow chart of the steps taken in performing a megapoll.

FIG. 2 is a flow chart of the steps taken in performing "a megapoll" which is the retrieval of management information from a target wherein the management information being retrieved is for all of the peripherals attached to the target and where the total size of the management information to be retrieved may exceed the amount allowed by the communications protocol for a single command. First the initiator, which could be the management server in FIG. 1, sends a request by means of the communications protocol to the target requesting the size of the management information to be sent also the initiator can determine if the target supports megapoll. In one embodiment, in which SCSI is the communications protocol, a mode sense command for a particular vendor-unique page code is issued. The page code which is retrieved contains the byte size for all of the mode pages of the megapoll. This byte size is used by the initiator to create a buffer for the subsequent receipt of the mode page data from the target. Although the request for the size of management information is present in the current embodiment, it is not a necessary step as a buffer could be allocated at the initiator without receipt of the mode page, however if the initiator wants to determine if the target supports Megapoll the mode page must be requested. The initiator then sends a retrieval command to the target (step 210). The retrieval command is a non-standard command which is compatible with the communications protocol. In the preferred embodiment, the retrieval command is a vendor-unique SCSI command descriptor block (CDB). In addition to the required parameters as defined by the SCSI protocol which include an operation code, a logical unit number, and a control parameter, the vendor-unique CDB contains a reference value and a length parameter. The opcode of the CDB can be used to indicate a megapoll or another parameter may be used to indicate the initiation of a megapoll. The reference value and the length parameter provide support for continuation tags which will be described below.

The target receives the retrieval command and the target software parses the command based on the known data structure. The retrieval command indicates in the opcode parameter that a megapoll of all of the mode pages should occur and as a result, the target software creates a target buffer. For example, the target buffer may be the byte size of all of the requested mode pages for the megapoll or a fixed size (step 220). The target software then creates the mode pages containing management information based on data stored in memory associated with the storage processor and by gathering status data from the attached devices. The mode pages are then encapsulated with a header which contains a tag parameter and a length parameter. Once the mode pages are in the required format they are placed into the target buffer (step 230). The target software then provides the contents of the target buffer to the SCSI bus for arbitration so that the mode pages are sent to the initiator (step 240).

Figure 3:
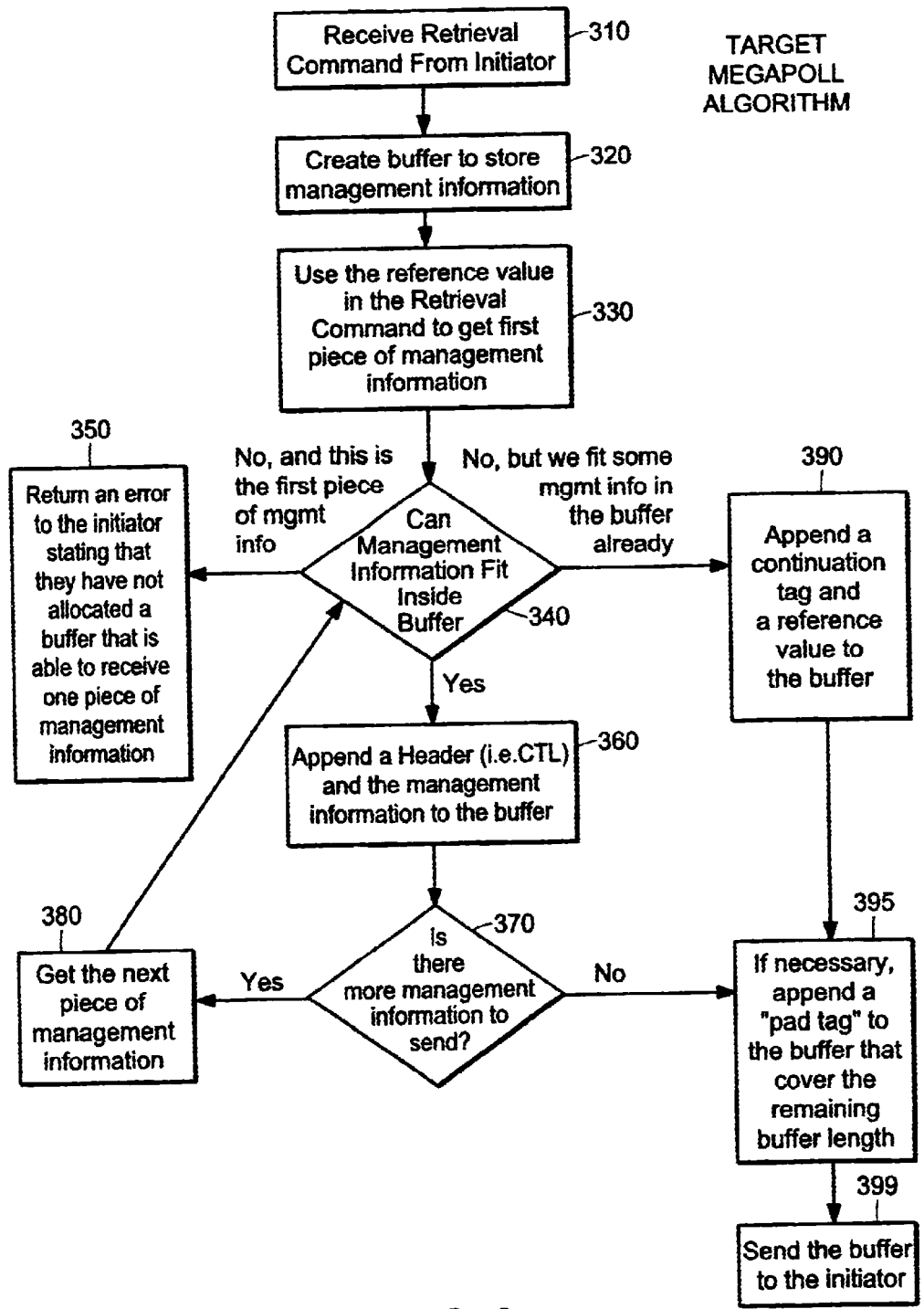
FIG. 3 is a flow chart of the steps taken by the target in response to receiving a retrieval command for a megapoll.

FIG. 3 is a flow chart of the steps taken by the target in response to receiving a retrieval command for a megapoll. The target software recognizes the received command as a vendor-unique retrieval command based on data in the CDB such as the opcode field (step 310). The target software then creates a buffer. One method for sizing the buffer is basing the buffer size on the length parameter sent in the retrieval command (step 320). The length in the retrieval command provides a maximum size of data that the initiator is capable of receiving at one time, for example, one such limitation would be the maximum buffer size of a host bus adapter. The target software identifies a reference value in the retrieval command which informs the target software to retrieve the first piece of management information (step 330). For example, the reference value may be set to zero which is an indication that this is the first retrieval command sent. The management information in the form of a mode page is retrieved. The creation of mode pages is known to those of ordinary skill in the art. The target software then attempts to place the management information into the target buffer (step 340). If the information does not fit into the buffer, an error message is returned to the initiator stating that a buffer could not be created which was capable of holding the first piece of management information (step 350). If the management information fits in the buffer a header is appended to the management information (step 360). One such format for the header consists of control, tag, and length (CTL) parameters. In such a format the control byte indicates the size of the tag and length parameters. The tag parameter indicates the type of management information that is being sent. For example, the tag may have a value of say 10, which indicates that the appended data will be for a mode page of a LUN. The length value then provides the length of the management information for a particular mode page. It should be understood by those skilled in the art that the disclosed method only requires that a tag parameter is part of the header. In such a configuration the tag parameter indicates the type of information that is being sent, as well as, providing indicia of additional information that still needs to be sent from the target. The target software then determines if there is more management information to be sent to the initiator (step 370). If there are more mode pages to be generated the target software generates the next mode page by gathering up the next piece of management information (step 380). The target software then attempts to place this new mode page into the buffer. If at this point the management information will not fit within the buffer, the tag parameter is set to indicate that the tag is a continuation tag and a reference value is generated (step 390). The continuation tag is interpreted by the initiator as an indication that additional mode pages are to be sent from the target. Additionally, the continuation tag informs the initiator that there will be a reference value in the data portion. The reference value is some indicia of the next mode page which needs to be sent to the initiator. The reference value may represent a memory address of the last byte of data in the mode page that is being sent, a pointer to a location in a hash table of the target buffer or another indicia of the next mode page that is to be sent. If the management information does not completely fill the buffer and the next mode page will not fit within the buffer or there is no additional management information to place in the buffer a pad tag is added (step 395). The pad tag is a data sequence placed in the data section which indicates a lack of information. For example, one pad tag might be a string of all ones or zeros. Once the target buffer is filled the management information is arbitrated onto the SCSI bus using the standard SCSI techniques resulting in the management information being sent to the initiator (step 395).

FIG. 4A is a schematic diagram which shows a server attached to a storage processor by means of a host bus adapter and a SCSI bus. In this figure a retrieval command is sent to the storage processor which has both the length parameter and the reference value along with an indicator for the target that this is a retrieval command and that all of the management information in the form of mode pages is to be gathered up and sent to the initiator. The target sends back the requested management information. The information comprises both mode pages in a data section and a header section. The header section can contain control byte, a tag parameter, and a length value. The tag parameter can contain a value that indicates that this is a continuation tag. A continuation tag indicates that additional mode page data at the target has not yet been sent to the initiator. As can be seen in FIG. 4B, multiple mode pages may be sent from the buffer of the target to the initiator at one time. Each mode page in this example has an attached header with a tag parameter which indicates the type of mode page being sent and a length parameter which indicates the length of all of the management information in the data section. FIG. 4C shows the final header and data section when there is a continuation. In the final header, the tag parameter is set to indicate a continuation which is also known as a continuation tag. The accompanying data section contains a reference value. This reference value is sent back to the target by the initiator in a subsequent retrieval command, so that the target software knows the data which still needs to be forwarded to the initiator.

Figure 5:
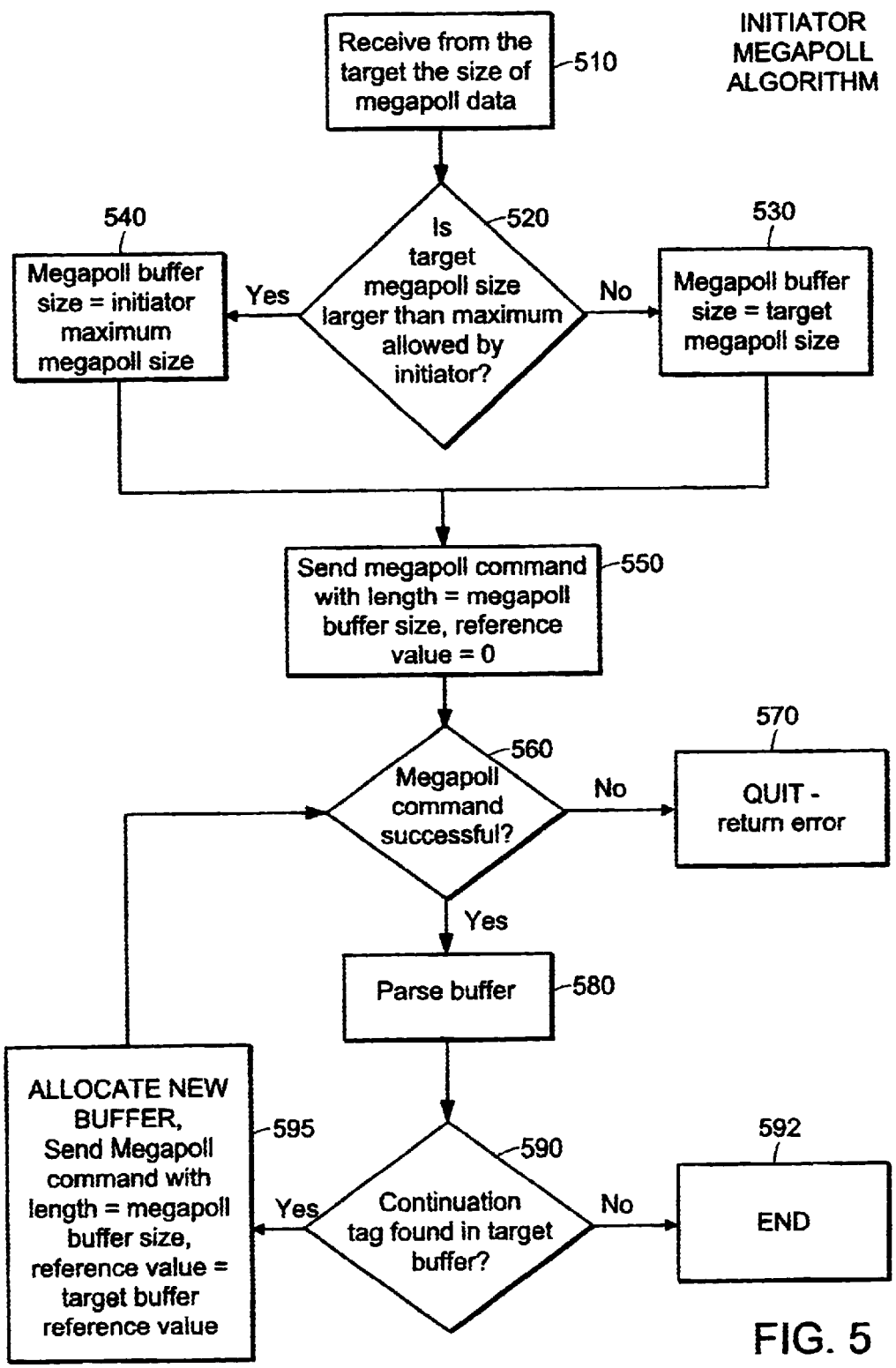
FIG. 5 is a flow chart of the steps taken by the initiator in issuing a megapoll request.

FIG. 5 is a flow chart of the steps taken by the initiator in issuing a megapoll request. The initiator first checks the size of the management information to be received by sending a vendor-unique SCSI mode sense page code command to the target (step 510). The initiator waits for the receipt of the requested mode page and then tests whether the size of the data of all of the mode pages on the target is larger than a maximum size allowed by the initiator (step 520). The maximum size allowed by the initiator may be limited by a buffer size constraint of the host bus adapter. The server software on the initiator polls the attached host bus adapter to determine if there is a limitation on the size of the adapter's buffer. Another technique is to hard code the size of the buffer of the host bus adapter, since the size can be known prior to compilation of the software on the server. The server software then stores this byte size restriction in the vendor-unique CDB format of the retrieval command. If the maximum size of the initiator buffer is less than the size of all of the mode page data at the target the initiator creates a buffer equal to the maximum size that the initiator is capable of receiving (step 540). If the mode page data is less than the maximum size of the data that the initiator is capable of receiving or if there is no limit on the size of data to be received at the initiator, a buffer is created at the initiator which is equal in size to the mode page data to be sent from the target buffer (step 530). The size of the buffer may be increased by the initiator to account for overhead such as continuation tags, header information and reference values. Alternatively the target may take into account the header information when the mode page is created. The initiator then creates a retrieval command. The retrieval command contains at least the user-defined parameters of length and a reference value. The length parameter provides the size of the buffer created at the initiator and the reference value provides indicia of a location from which the target should begin sending the remaining unsent data. The first time a retrieval command is created the reference value is sent with some user-defined sign that no continuation tags have been sent (step 550). In the preferred embodiment the value of the initial reference value is zero. After the retrieval command is sent, the initiator waits for receipt of the mode page data from the target. The initiator checks to see if the retrieval command was successful (step 560). This check may be based on whether a response is received to the retrieval command within a given time. Additionally, if data is received the check includes whether the mode page data which is received fits within the allocated buffer. If the retrieval command is not successful, an error message is generated and the initiator ends the process (step 570). If the retrieval command was successful, then the buffer is parsed (step 580). The buffer is parsed so as to form a table which indicates mode page data from header data and makes an association of the data with a mode page. Alternatively a linked list could be used or the buffer could be searched each time. When the data is parsed, if a continuation tag exists in the last header in the buffer, a reference value is retrieved from the associated data portion (step 590). The initiator then allocates a new buffer for the next mode page data which is to be sent by the target (step 595). The initiator allocates the buffer in a similar fashion as before. The buffer is sized based upon any limitations of the initiator. It should be understood by those skilled in the art that the management information received from the target in continuations may be stored in a single buffer or as in the preferred method in individual buffers. The initiator then creates a new retrieval command. This retrieval command contains a length size which is equivalent to the size of the buffer created at the initiator and the reference value which was parsed from the buffer. Also, the reference value retrieved from the target is also placed into the retrieval command. This retrieval command is then sent to the target and the method returns to step 560 and continues to step 590 until there are no more continuation tags found (step 592).

A megapoll can be set to occur at timed intervals so that the management information is automatically transmitted from a target to the initiator or a megapoll may be triggered each time a request is made to the server software. In one embodiment, if there are any requests for mode pages from an application at the management server or through the server agent during a megapoll or between timed intervals when a megapoll is set at timed intervals, the server software receives the request which is in the form of a mode select/sense command combination. The mode select/sense combination is passed through a filter which checks to see if the commands should by placed into arbitration on the SCSI bus. For example, if a mode select/sense combination for the status of a power supply is issued, the commands would be allowed to filter through and sent to the target. One reason for allowing the commands to be sent to the target is that the status of the power supply is time sensitive. If it is determined that the request should not be placed on the SCSI bus, the initiator accesses the hash table to obtain the management information from the requested mode page of the mode select/sense combination. By redirecting the mode select/sense combination, the commands are not sent from the originator to the target and back. The information is present on the originator and can be quickly retrieved without having to wait for two round trip cycles from the originator to the target and back. It should be obvious to one skilled in the art, that this embodiment may be adapted, so that when a mode sense/select request is made, a megapoll occurs, and the management information is requested and passed to the server, and then the mode sense commands are used to access the mode page data after the management information is parsed as described above.

In another embodiment as a mode select/sense command combination is received into the agent software at the initiator, the commands are passed to the server software which cause a megapoll to occur. Once the management information is passed to the originator buffer by the megapoll, the server software redirects the original mode select/mode sense commands and accesses the requested mode pages from the originator buffer. The requested mode pages and management information contained therein are then passed to the agent software and are sent to the requesting application.

Figure 6A:
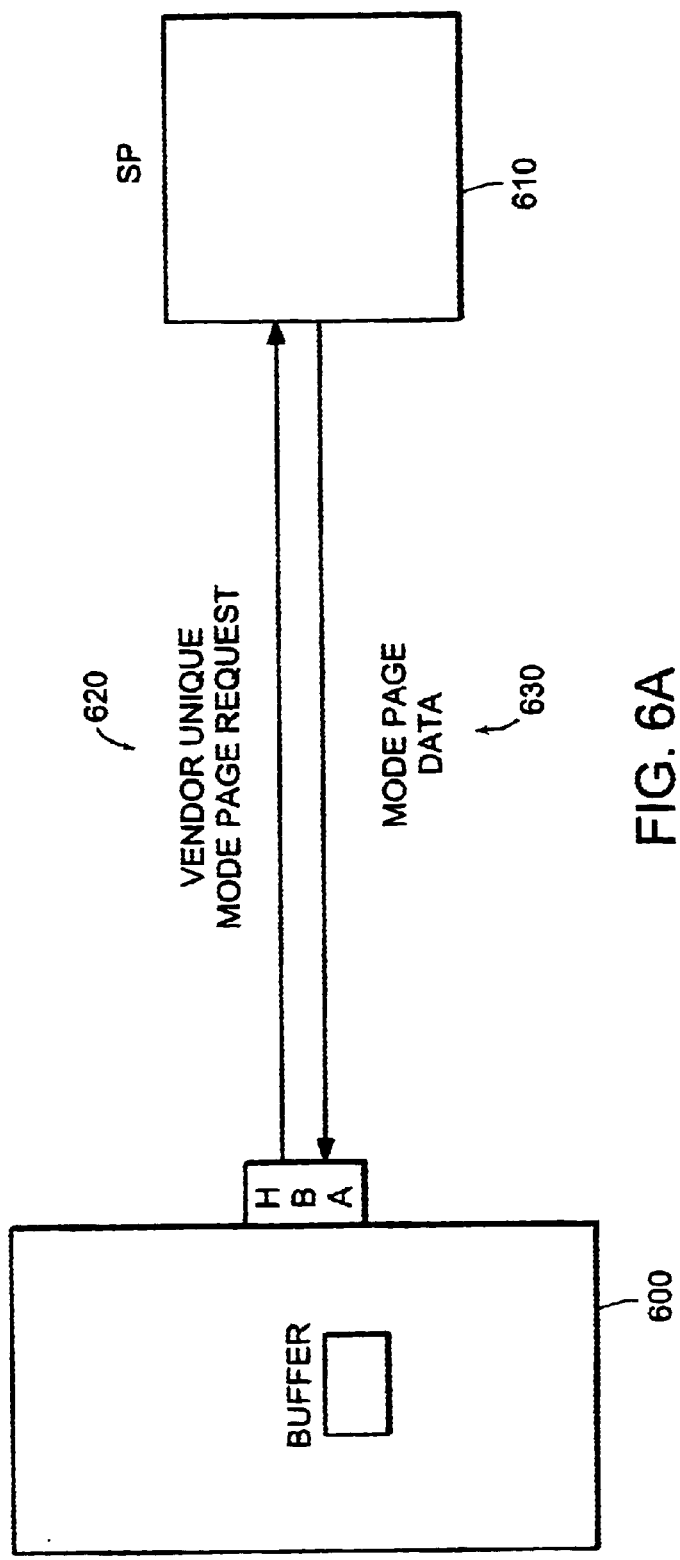
FIG. 6A is a schematic drawing showing a user defined mode page request being sent from the initiator to the target.
Figure 6B:
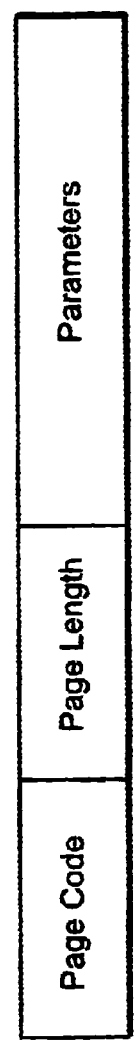
FIG. 6B shows an exemplary mode page created by the target.

FIG. 6A shows a schematic diagram of a server 600 and storage processor 610 wherein the server 600 is shown issuing the vendor-unique SCSI mode sense page code command 620 to retrieve the size of all of the mode pages available at the target. The target in response to the vendor-unique command creates a mode page. FIG. 6B shows an exemplary mode page created by the target. The mode page contains a required header which consists of a page code parameter which indicates the particular mode page being sent, a page code length which provides the size of the data section, and a parameter section. In this vendor unique page code, the parameter section contains a value which represents the overall size of the data in all of the mode pages for the target. This size value may be increased beyond the actual size of the mode page data prior to sending or upon receipt at either the target or the initiator to account for the overhead of sending the data, such as the header information and expected continuation tags and reference values as shown in FIG. 4B and FIG. 4C. The size of the mode pages is determined by a query of stored information associated with the target which contains mode page data and through direct access to the peripheral devices such as the disks. Examples of mode page data which requires access to the peripheral device is status information such as the status of a fan or power supply in a disk array.

Figure 7:
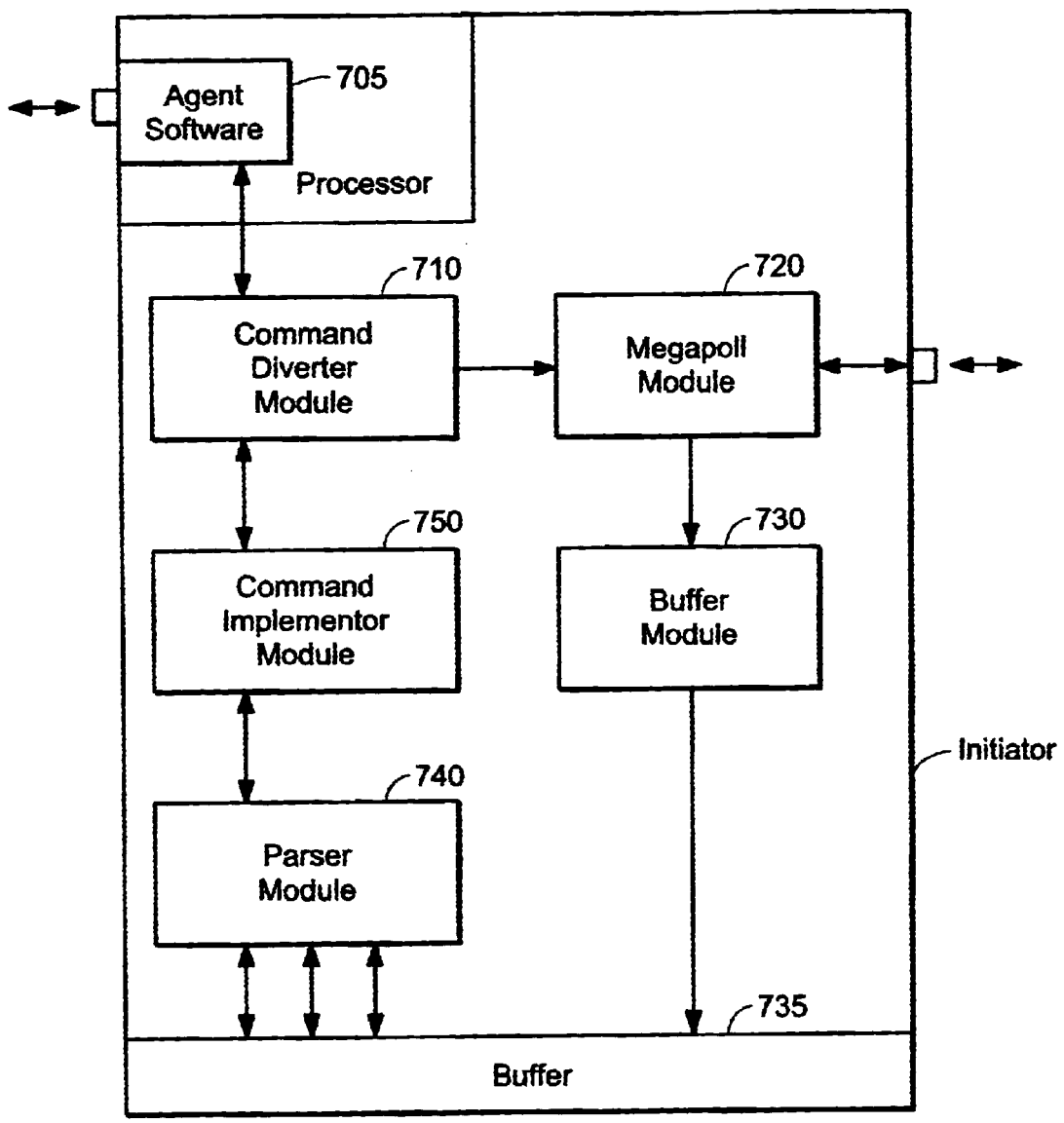
FIG. 7 is an schematic drawing of the modules contained in the initiator for the retrieval of management information.

FIG. 7 shows a schematic drawing of the modules contained in the initiator 700 for retrieving management information from a target. A command diverter module 710 receives the mode select/mode sense commands from the agent software 705. The command diverter module 710 filters the command determining if the commands should be sent to the target If the commands are filtered and not sent to the target, a signal is sent from the command diverter module to a megapoll module. The megapoll module 720 generates a retrieval command which is compatible with the SCSI protocol. The retrieval command causes management information about the status of all peripherals connected to the target to be sent to the initiator. A buffer module 730 creates a buffer either on-the-fly or in response to a mode sense command where the buffer that is created is equal in size to the management information retrieved by the initiator in response to the retrieval command. As the management information is received at the initiator, the management information is placed into the created buffer 735 and a parser module 740 parses the management information so that the management information is identifiable as mode pages. The command implementor module 750 is passed the mode sense/mode select commands and accesses the parsed management information to locate the requested mode page. The mode page or pages are then passed to the requesting application or to the agent software so the mode pages can be sent to the remote requester.

In an alternative embodiment, the disclosed apparatus and method for retrieval of management information may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A method of retrieving management information in a protocol environment wherein the protocol environment uses a protocol having a data structure with an associated maximum retrieval byte size, the method comprising: sending a retrieval command from the initiator to the target, the retrieval command capable of retrieving more information than the maximum retrieval byte size; creating a target buffer at the target in response to the retrieval command; filling the target buffer with management information associated with the target; and sending the management information from the target buffer to the initiator.

2. A method according to claim 1, further comprising the step of:
   if all of the management information is not retrieved, sending a second retrieval command to retrieve at least a portion of the unsent management information.

3. A method according to claim 1, wherein the protocol is a SCSI protocol and the retrieval command is sent from the initiator to the target via a cable.

4. The method according to claim 3, wherein the cable is a SCSI bus.

5. The method according to claim 3, wherein the cable is an optical fibre cable.

6. The method according to claim 1, wherein the step of sending includes
   sending the management information from the buffer of the target to a host bus adapter, the host bus adapter having a maximum input buffer size; and
   sending the management information from the host bus adapter to a server buffer.

7. The method according to claim 6, wherein the management information is sent to the host bus adapter in data chunks which are limited to the maximum size of the input buffer size.

8. The method according to claim 7, wherein the data chunks have appended header information.

9. The method according to claim 8, wherein the data chunks contain management information formed as mode pages.

10. The method according to claim 8, wherein the header information of each data chunk includes a tag parameter.

11. The method according to claim 10, wherein if the tag parameter is set as a continuation tag, additional data chunks reside at the target.

12. The method according to claim 11, wherein the continuation tag is accompanied by a reference value which identifies a next data chunk so that the next chunk can be sent from the target buffer to the host bus adapter.

13. The method according to claim 12, wherein the reference value resides within the data chunk.

14. The method according to claim 7, wherein a subsequent retrieval command is sent from the host bus adapter to the target when the host bus adapter is free to receive additional information.

15. The method according to claim 14, wherein the subsequent retrieval command includes a chunk length parameter along with a reference value from the previous chunk.

16. The method according to claim 8, wherein a subsequent retrieval command is not issued if a continuation tag is not received by the initiator.

17. The method according to claim 1, wherein the buffer stores the management information for all devices attached to the target.

18. The method according to claim 3, wherein the retrieval command is vendor-unique and SCSI protocol compatible.

19. The method according to claim 1, further comprising:
   creating a server buffer based upon a total number of bytes of management information to be sent to the initiator.

20. The method according to claim 19, wherein the server buffer is limited to the size of the initiator buffer.

21. The method according to claim 19, further comprising:
   receiving the management information into the initiator buffer;
   parsing the management information; and
   accessing requested management information from an application from the initiator buffer as the result of the management information being parsed.

22. The method according to claim 21, wherein the step of parsing creates a hash table and the step of accessing accesses the management information from the hash table.

23. An information retrieval system in an initiator for retrieving management information from a target in a SCSI environment, the system comprising:
   a command diverter module for receiving a SCSI command and stopping the SCSI command from being introduced onto the SCSI bus,
   a megapoll module for sending a retrieval command compatible with the SCSI protocol for retrieval of all management information of all devices connected to the target;
   a buffer module for creating a buffer at the server sized according to a total byte size of all the management information to be retrieved by the retrieval command;

a parser module for parsing the management information from the buffer; and a command implementor module for receiving the SCSI command from the command diverter module and accessing the parser module to locate the management information requested in the SCSI command.

24. A computer program on a computer readable medium for use in retrieving management information from a target in an environment using a communication protocol, the communication protocol having a communication protocol retrieval command for retrieving management information, wherein the communication protocol can retrieve management information up to a maximum size, the computer program comprising:

computer code for generating a user-defined retrieval command compatible with the communication protocol causing retrieval of management information where the management information is in excess of the maximum size.

25. A computer program on a computer readable medium for retrieving management information from a target in an environment using a communication protocol, the communication protocol having a communication protocol retrieval command for retrieving management information, wherein the communication protocol can retrieve management information up to a maximum size, the computer program comprising:

computer code for requesting a size of all management information located at a target;

computer code for creating a buffer in response to a received size of all management information at a target;

computer code for generating a user-defined retrieval command compatible with the communication protocol causing retrieval of management information where the management information is in excess of the maximum size;

computer code for sending the retrieval command; and computer code for receiving management information in response to the retrieval command.

26. The computer program according to claim 25, further comprising:

computer code for creating a buffer to store the retrieved management information.

27. The computer program according to claim 26, further comprising:

computer code for parsing the management information in the buffer.

28. The computer program according to claim 26, wherein the communication protocol is SCSI.

29. The computer program according to claim 27, wherein the computer code for parsing parses the management information into mode pages.

30. The computer program according to claim 27, further comprising:

computer code for intercepting communication protocol retrieval commands and stopping the commands from being sent to a target.

31. The computer program according to claim 30, wherein the communication protocol retrieval commands are SCSI mode sense and SCSI mode select commands.

32. The computer program according to claim 31, further comprising:

computer code for interpreting the communication protocol retrieval commands and obtaining requested management information from the buffer.

* * * * *